United States Patent [19]
Jagadish et al.

[11] Patent Number: 6,105,863
[45] Date of Patent: *Aug. 22, 2000

[54] METHOD AND SYSTEM FOR CONTINUING BILLING ARRANGEMENTS

[75] Inventors: Hosagrahar Visvesvaraya Jagadish; Inderpal Singh Mumick, both of Berkeley Heights, N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/933,490

[22] Filed: Sep. 18, 1997

[51] Int. Cl.[7] .................................................. G06F 17/60

[52] U.S. Cl. .......................................... 235/379; 235/380

[58] Field of Search ................................. 235/379, 380; 902/1, 5, 8, 12, 22, 24, 40; 705/35, 41

[56] References Cited

U.S. PATENT DOCUMENTS

| | | | |
|---|---|---|---|
| 5,023,436 | 6/1991 | Takada et al. | 235/380 |
| 5,053,606 | 10/1991 | Kimizu | 235/379 |
| 5,350,906 | 9/1994 | Brody et al. | 235/379 |
| 5,365,046 | 11/1994 | Haymann | 235/380 |

Primary Examiner—Donald Hajec
Assistant Examiner—Karl Frech

[57] ABSTRACT

A method of processing transaction charges from continuing billing arrangements that allows such charges to continue to be authorized after the account number to which the charges are directed has been invalidated, such as would result if the account number related to a credit or debit card that was lost, stolen or expired, or to a checking or savings account that was closed or transferred. A security key is used to indicate charges that are to be authorized after the account number has been invalidated. Charges that include the key are authorized, while charges that do not include the key are rejected.

49 Claims, 5 Drawing Sheets

METHOD AND SYSTEM FOR CONTINUING BILLING ARRANGEMENTS

FIELD OF THE INVENTION

The present invention relates to billing of charges to credit cards, debit cards, checking accounts and other financial accounts.

BACKGROUND OF THE INVENTION

It is becoming increasingly possible to set up continuing billing arrangements charged to a credit card, debit card, checking account or other financial account. Typically, a customer fills in a form that gives a merchant authorization for not just a single charge, but for a series of (typically periodic) charges to a specified credit card or account. Examples of merchants that accept such arrangements include long distance telephone carriers, newspaper home delivery services, automobile rental agencies, discount dining clubs, book clubs and music clubs. Each month, or upon each sale, the merchant charges the appropriate amount to the specified credit card or account.

Customers occasionally lose their credit or debit cards or have them stolen. When this happens, the customer notifies the card issuer, which cancels the card to prevent misuse. The card issuer then issues a new card, having a new account number, to the customer. Likewise, checking, savings or other financial accounts may be closed or transferred. All further charges to the old card account or to the old financial account, including charges from merchants having continuing billing arrangements, are no longer honored. This causes inconvenience to customer, who must supply such merchants with new card or financial account numbers and authorizations. Customers may also have to pay additional fees, such as "late charges", to merchants, due to the fact that certain billing transactions were not honored. Costs are also imposed upon merchants, due to delayed receipt of payments and due to having to process new authorization paperwork.

Many credit and debit cards have expiration dates. Any authorization that a customer has made to a merchant is not valid after the expiration date of the specified card, until the authorization is renewed. If a card is allowed to expire, without a new authorization having been processed, problems may arise that are similar to those which arise when a card is lost or stolen.

A need arises for a technique which would avoid the cost and inconvenience caused by loss or expiration of credit or debit cards, or the closing or transfer of financial accounts, without exposing customers or merchants to increased risk of fraudulent charges made to stolen or expired cards or closed accounts.

SUMMARY OF THE INVENTION

One aspect of the present invention is a method of processing transaction charges from continuing billing arrangements that allows such charges to continue to be authorized after the account number to which the charges are directed has been invalidated, such as would result if the account number related to a credit or debit card that was lost, stolen or expired, or to a checking or savings account that was closed or transferred. A security key is used to indicate charges that are to be authorized after the account number has been invalidated. Charges that include the key are authorized, while charges that do not include the key are rejected. The present invention thus avoids the cost and inconvenience caused by loss or expiration of cards or closing of accounts, yet does not expose customers or merchants to increased risk of fraudulent charges made using stolen or expired cards.

In one embodiment of the present invention, a notification is received that a credit or debit card, which has an account number, has been invalidated. In response to receiving a charge including the account number and a security key, the charge is authorized. In response to receiving a charge including the account number and not including the security key, the charge is rejected.

In another embodiment of the present invention, a first charge, which includes an account number relating to a continuing billing arrangement, is received from a merchant. A charge authorization, including a security key; is sent to the merchant. A notification that the account number has been invalidated is received. In response to receiving a second charge including the account number and the security key, the charge is authorized. In response to receiving a second charge including the account number and not including the security key, the charge is rejected.

BRIEF DESCRIPTION OF THE DRAWINGS

The details of the present invention, both as to its structure and operation, can best be understood by referring to the accompanying drawings, in which like reference numbers and designations refer to like elements.

FIG. 3b is a block diagram of an exemplary credit card clearing system shown in FIG. 3a FIG. 3c is a block diagram of an exemplary merchant terminal shown in FIG. 3a.

DETAILED DESCRIPTION OF THE INVENTION

The present invention is applicable to credit and debit cards and their associated accounts and other types of financial accounts, such as checking, savings, N.O.W., or money market accounts. For simplicity, the term "account" shall refer to all such accounts and all similar types of accounts, unless the contrary is indicated.

When a credit or debit card is lost, stolen, or expires, the card is invalidated. Conventionally, no further charges of any kind, which are made to an account associated with an invalidated card, will be authorized by the clearinghouse that is processing the charge. Likewise, when a financial account is closed or transferred, no further charges may be made to the account In the present invention, charges to an account which relate to continuing billing arrangements will still be authorized, even though the credit or debit card associated with the account being charged has been invalidated or the account being charged has been closed or transferred.

Figure 1A:
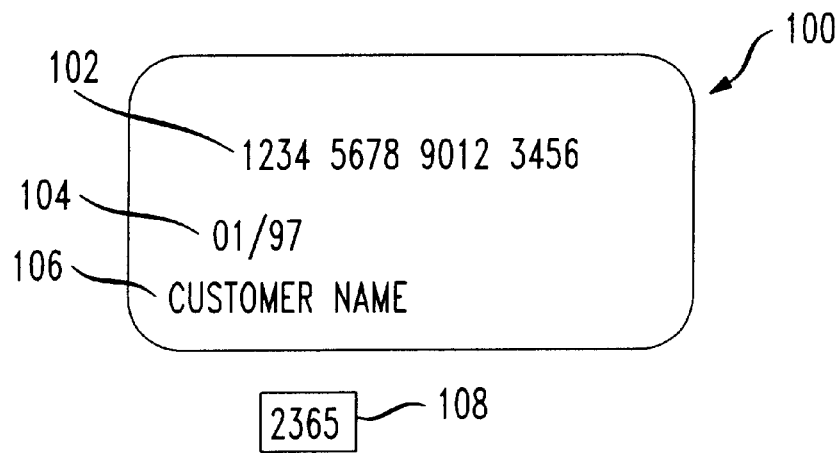
FIG. 1a is an exemplary credit card, according to one embodiment of the present invention.

In one embodiment of the present invention, a security key associated with an account number is supplied to a customer. For example, in FIG. 1a, an exemplary credit or debit card 100, according to the present invention, is shown. Card 100 includes a conventional account number 102, conventional expiration date 104 and conventional customer name 106. Associated with credit card 100 is a security key 108, according to the present invention. The only requirements on security key 108 is that it not be confused with the other information associated with the credit card, such as the account number or expiration date. For example, in one embodiment, security key 108 may be a numeric string. In order to prevent confusion, security key 108 may have a different number of digits than account number 102 or expiration date 104. As an alternative, security key 108 may have the same number of digits as, for example, expiration date 104, but may have a value that a valid expiration date could not have. For example, a typical expiration date has four digits, with the first two digits being the month of expiration. In order for the expiration date to be valid, the first two digits must be in the range of "01" to "12". Thus, security key 108 may also be a four digit number, but having the first two digits of "00" or in the range of "13" to "99".

Likewise, a security key may be associated with other account instruments, such as checks, negotiable orders of withdrawal, etc.

Figure 1B:
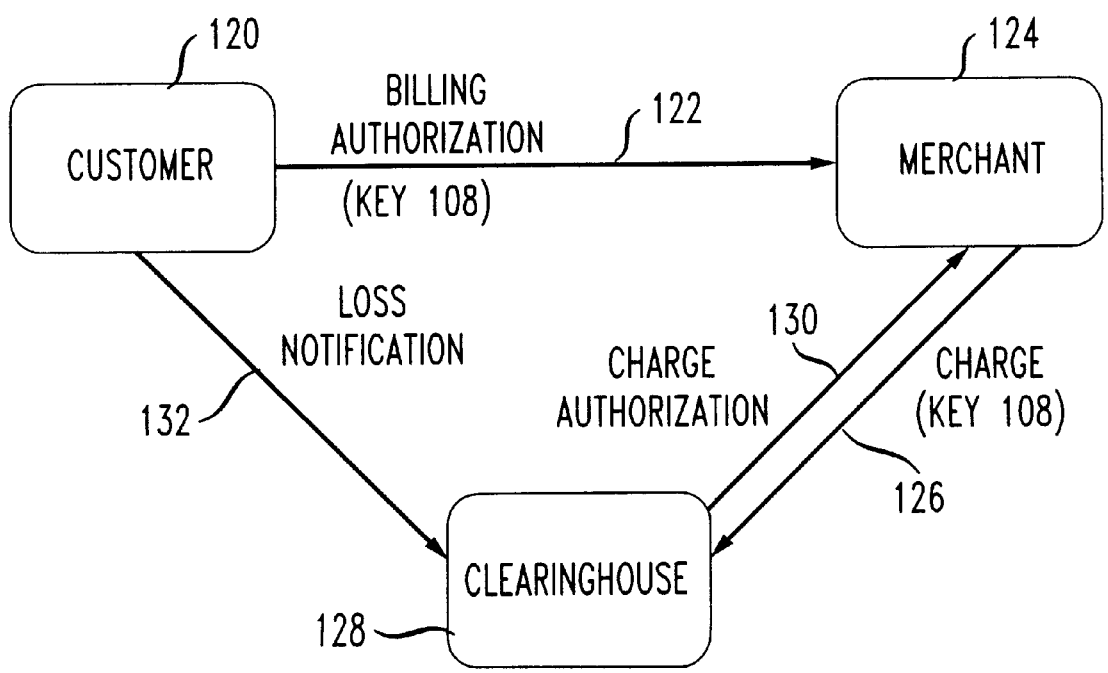
FIG. 1b is a block diagram of continuing billing arrangement data flow, according to one embodiment of the present invention.
Figure 1C:
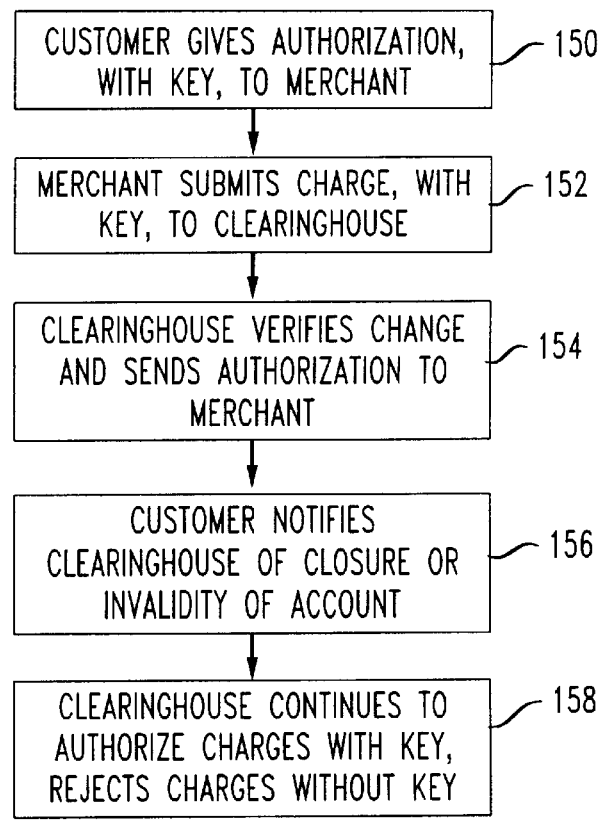
FIG. 1c a flow diagram of a continuing billing arrangement process, according to one embodiment of the present invention.

A continuing billing arrangement using security key 108, according to the present invention, is shown in FIG. 1b. It is best viewed in conjunction with FIG. 1c, which is a flow diagram of a continuing billing arrangement process, according to one embodiment of the present invention. A customer 120 establishes a continuing billing arrangement by giving a continuing billing authorization 122, including the security key 108, to a merchant 124 (step 150). Authorization 122 includes the customer's account number, the customer's name and the security key. The merchant then submits transaction charges 126, including the security key 108, to clearinghouse 128 (step 152). Clearinghouse 128 is any organization which processes account transactions, such as a credit card clearinghouse, a bank or other financial institution, or a credit card company. Such an organization would typically operate, or participate in the operation of a financial clearing system, such as a credit card clearing system or a check clearing system, which actually performs the processing of the transaction. Charge 126 is directed to the appropriate clearinghouse by the merchant or the merchant's depository institution, based on the type of account to which the charge is directed.

Charge 126 includes the amount of the charge, the account number to be charged and security key 108. Clearinghouse 128 verifies the charge and transmits charge authorization 130 to merchant 124 (step 154). Should a credit or debit card associated with the authorized account be invalidated, such as by loss or theft, or should a financial account be closed or transferred, customer 120 will notify 132 the clearinghouse 128 of the loss (step 156). Although, for clarity, loss notification 132 is shown as a simple step, in practice, loss notification may be more involved. For example, customer 120 will typically directly notify the credit card issuer of loss or theft of a credit card or an account holding institution that an account is to be closed or transferred. If the clearinghouse is separate from the issuer or institution, the issuer or institution must notify the clearinghouse separately.

Clearinghouse 128 continues to process transaction charges. Those charges that include security key 108 continue to be authorized, while those charges that do not include security key 108, but only include, for example, the expiration date, are rejected (step 158).

If a credit or debit card is invalidated, the associated account may not be invalidated. In this situation, transaction charges that include the security key may continue to be charged to the originally authorized account number. However, if the originally authorized account is closed, transaction charges cannot continue to be billed to that account. In this situation, the customer may provide the clearinghouse with a substitute account number, to which charges may be made. Additional transaction charges that are made to the original account number, but which include the security key, are charged to the substitute account, while charges that do not include the security key are rejected.

Figure 2A:
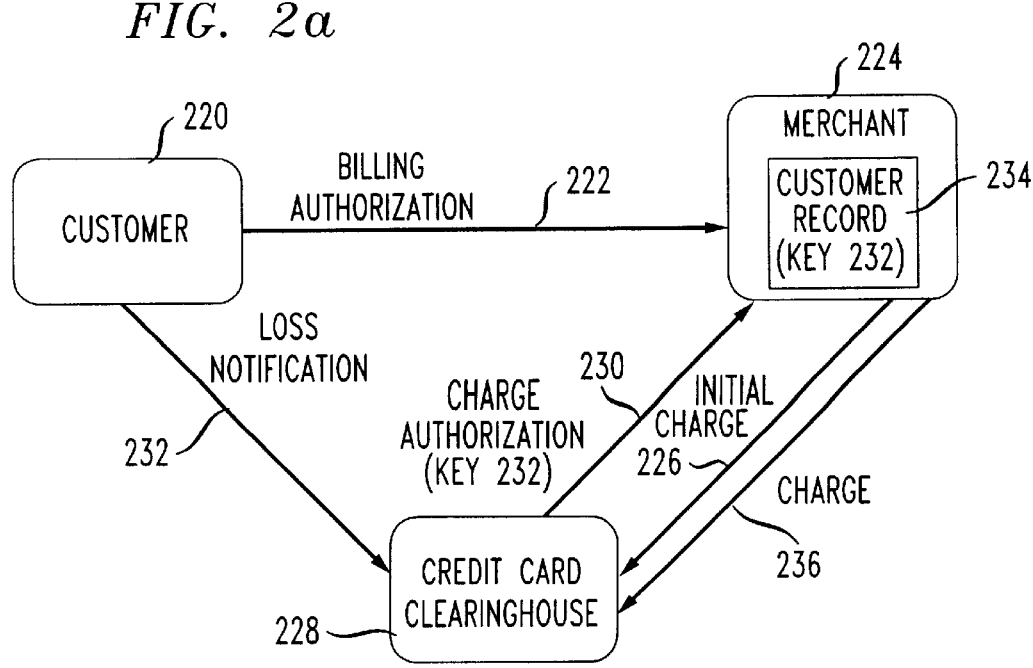
FIG. 2a is a block diagram of continuing billing arrangement data flow, according to another embodiment of the present invention.
Figure 2B:
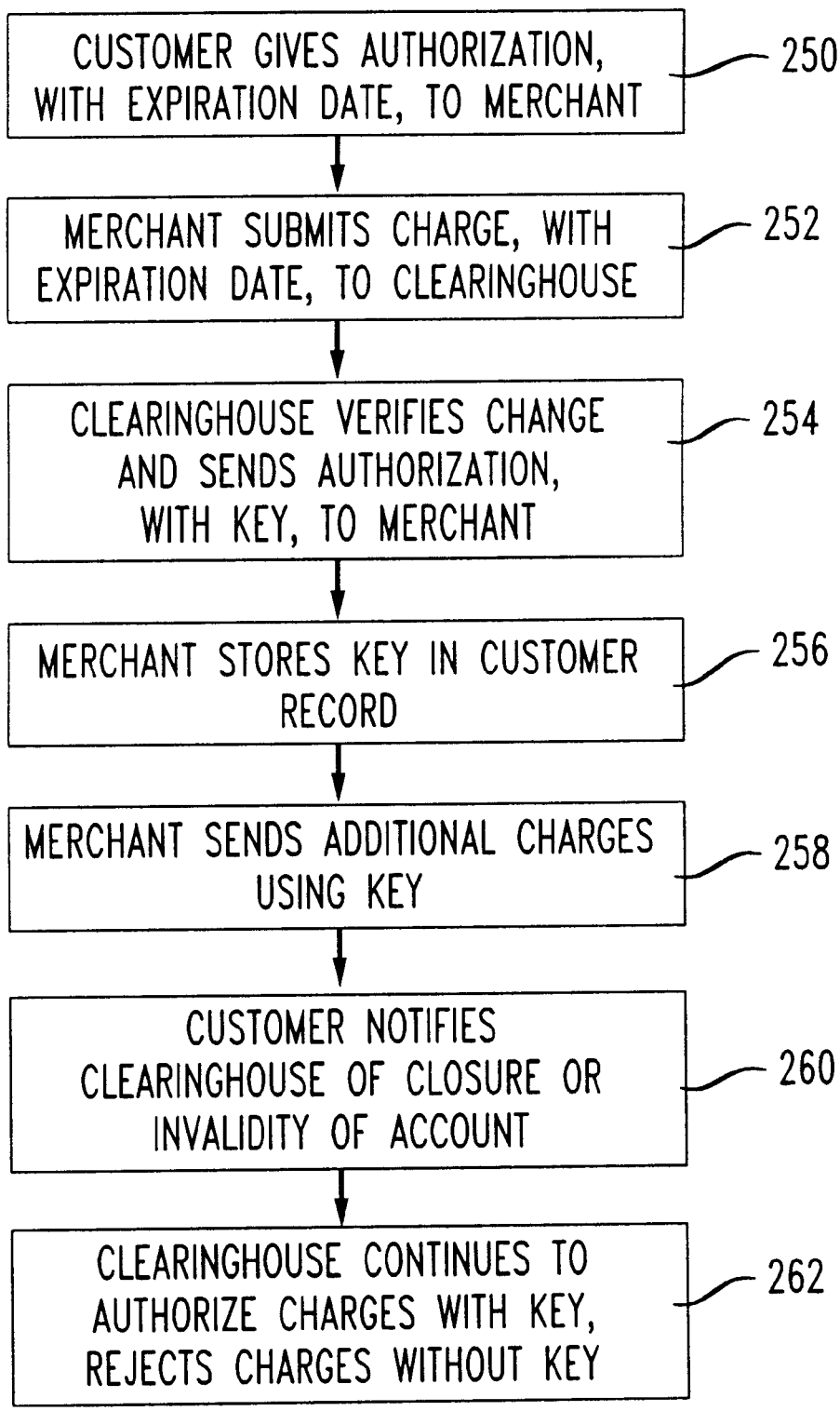
FIG. 2b is a flow diagram of a continuing billing arrangement process, according to another embodiment of the present invention.

In another embodiment of the present invention, the customer is not required to be aware of any key, such as security key 108, as is used in the previous embodiment. In this embodiment, shown in FIG. 2a, a conventional credit card or check, which have no associated security key, may be used by the customer. FIG. 2a is best viewed in conjunction with FIG. 2b, which is a flow diagram of a continuing billing arrangement, according to another embodiment of the present invention. A customer 220 establishes a continuing billing arrangement by giving a continuing billing authorization 222 to a merchant 224 (step 250). Authorization 122 includes the customer's account number, the customer's name and, for a credit card, a conventional expiration date. The merchant then submits initial transaction charges 226, including the expiration date, if applicable, to clearinghouse 228 (step 252). Charge 226 includes the amount of the charge, the account number to be charged and the expiration date, if applicable. Clearinghouse 228 verifies the charge and transmits charge authorization 230 to merchant 224 (step 254). Charge authorization 230 includes a security key 232, which is valid for that particular customer's account. Security key 232 is stored by merchant 224 in a customer record 234 (step 256). Merchant 224 may then transmit additional charges, such as charge 236, corresponding to additional transactions, using security key 232 (step 258). Should the authorized account be closed or invalidated, such as by loss or theft of a credit card, or closure or transfer of a financial account, customer 220 will notify 232 the clearinghouse 228 of the loss (step 260). Clearinghouse 228 then continues to process transaction charges. Those charges that include security key 232 continue to be authorized, while those charges that do not include security key 232, but only include, for example, the expiration date, are rejected (step 262).

Likewise, in this embodiment, when an associated account is not invalidated, transaction charges that include the security key may continue to be charged to the originally authorized account number. If the originally authorized account is closed, the customer may provide the clearinghouse with a substitute account number, to which charges may be made. Additional transaction charges that are made to the original account number, but which include the security key, are charged to the substitute account, while charges that do not include the security key are rejected.

This embodiment of the present invention provides the capability to assign different security keys to different continuing charge agreements. This allows the clearinghouse to verify aspects of the transaction that cannot be verified by conventional transaction processing. For example, the clearinghouse may use the security key included in the transaction charge to locate information relating to the identified charge agreement. This information may include the merchant that is authorized to make the charge, dates or timing the charges are to be made, and the authorized amount, or range of amounts, of the charge. The credit card clearinghouse may then verify that the charge was submitted by the proper merchant, that the charge was submitted at the proper time, and that the charge is for the proper amount, or within the proper range of amounts.

This embodiment of the present invention allows special processing to be applied if the credit card involved has been lost or stolen, or has expired. For example, charges that include one of the authorized security keys may be redirected to one or more other accounts belonging to the customer. This can be done transparently to the merchant and to the customer. As another example, charges including one of the authorized security keys may be tentatively billed to the customer. The customer could then indicate whether the billing arrangement should be continued or terminated. As another example, the merchant could be informed of the change in circumstance and could obtain reauthorization. As another example, when a customer reports a credit card as lost or stolen, he has the option of specifying billing arrangements that are to be continued. The credit card clearinghouse then tracks the charges made to the old account from the merchants involved in the specified billing arrangements and validates those charges.

Figure 3A:
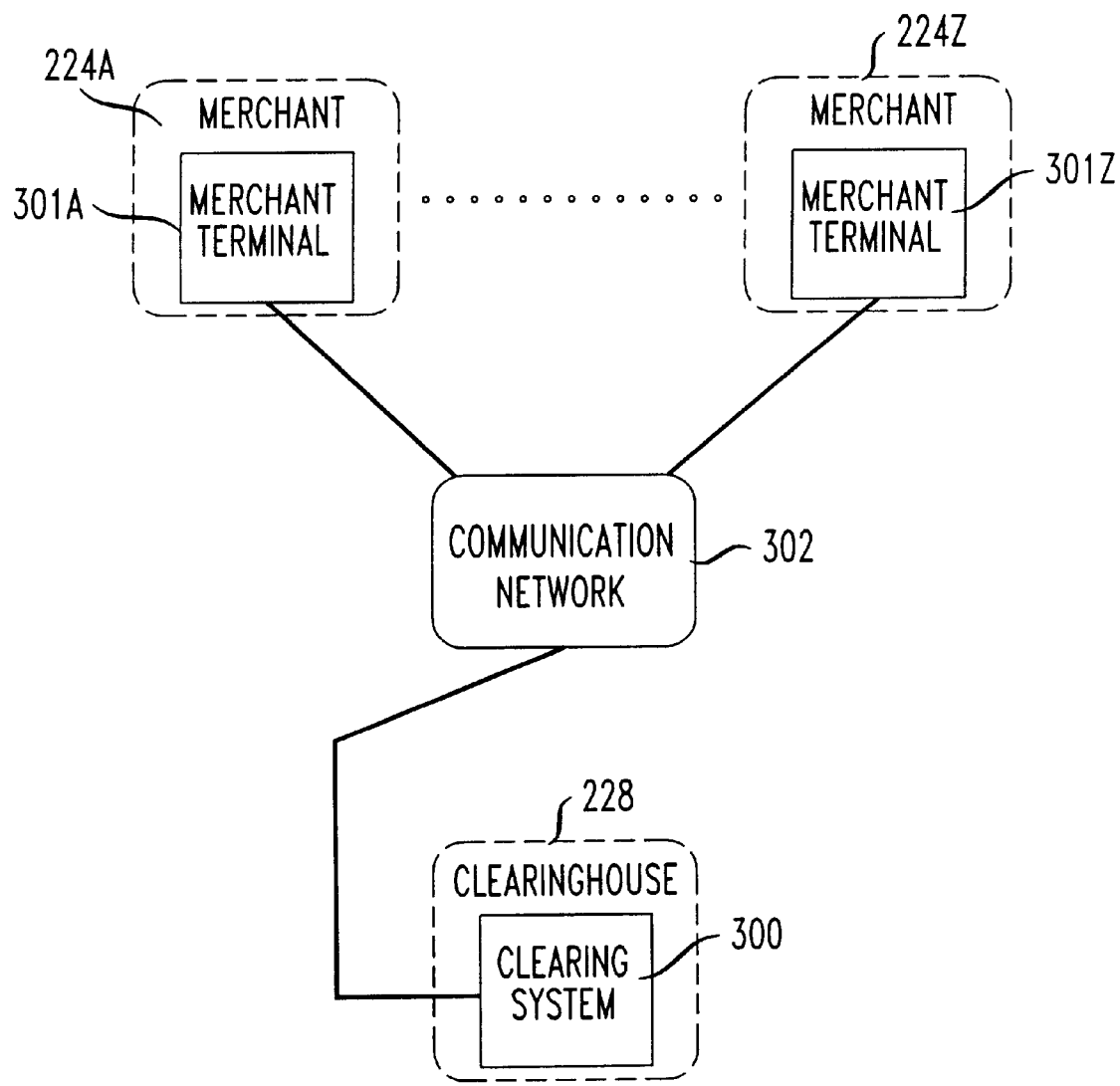
FIG. 3a is a block diagram of an exemplary system in which the present invention may be implemented.

An exemplary system in which the present invention may be implemented is shown in FIG. 3a. Clearinghouse 228 is shown to include a clearing system 300, which is a system that processes financial transactions. A plurality of merchants, such as merchants 224A and 224Z, are shown to include merchant terminals, such as terminals 301A and 301Z. The plurality of merchant terminals are communicatively connected to the clearing system 300 by a communication network 302. Communication network 302 may be any well-known network. For example, the public switched telephone network may be used, or a private or public local or wide area network may be used.

Figure 3B:
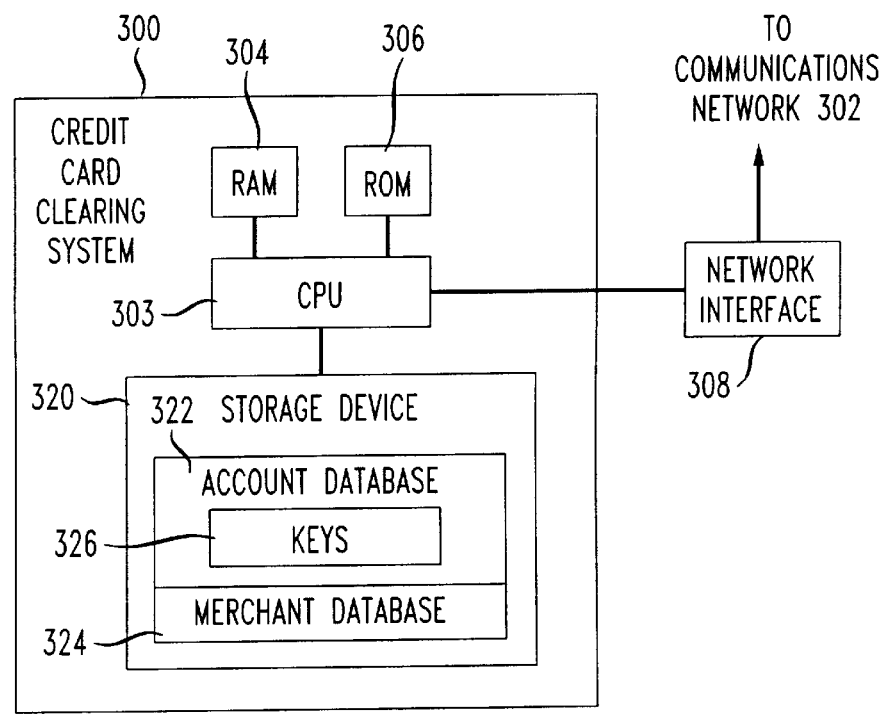

An exemplary clearing system 300, such as would be operated by a clearinghouse, is shown in FIG. 3b. System 300 includes central processing unit (CPU) 302, which is connected to random access memory (RAM) 304, read-only memory (ROM) 306, communication interface 308 and storage device 320. CPU 302 may comprise a microprocessor, for example, an INTEL PENTIUM processor, or CPU 302 may comprise a mini-computer or mainframe processor. RAM 304 and ROM 306 store program instructions that are executed by CPU 302 and data that is used during program execution. Communication interface 308, which couples controller 300 to communication network 302 and allows data communications with other elements comprising the present invention, may comprise, for example, a conventional modem or local/wide area network adapter. Storage device 320, which stores data that is used by the present invention, may comprise, for example, a magnetic disk and/or optical disk and may also comprise a magnetic tape.

Storage device 320 includes account database 322 and merchant database 324. Account database 322 stores information about each account processed by the clearinghouse and includes the security keys 326 associated with each account. Merchant database 324 stores information about each merchant that deals with the clearinghouse.

Figure 3C:
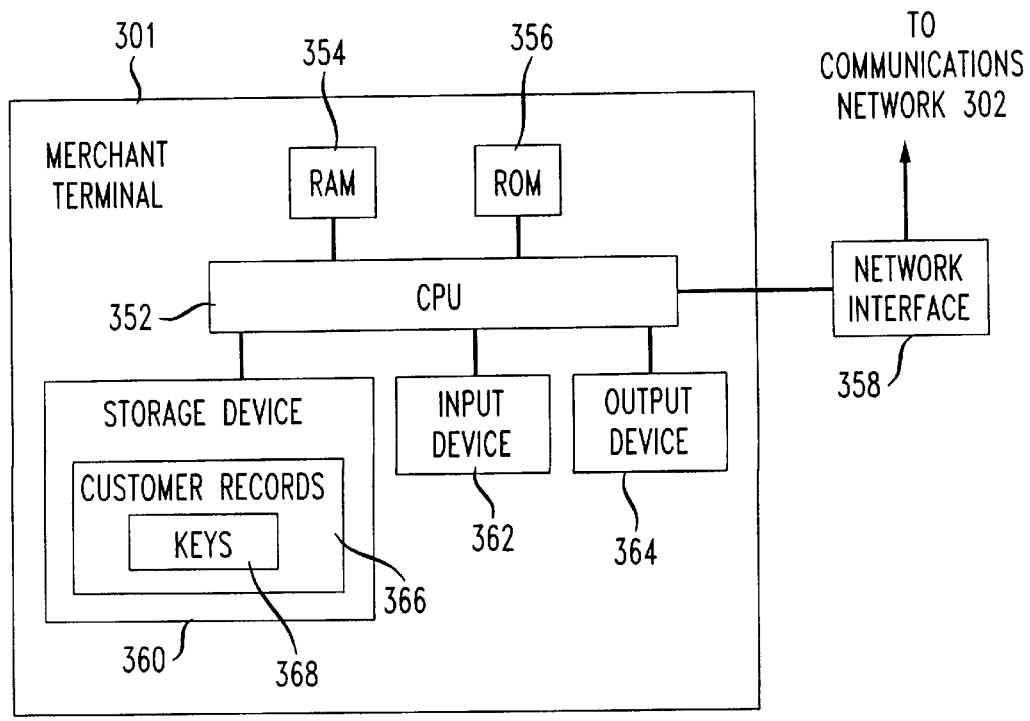

An exemplary merchant terminal 350 is shown in FIG. 3c. This figure is representative of either a general-purpose computer system or a dedicated terminal.

The system/terminal includes central processing unit (CPU) 352, which is connected to random access memory (RAM) 354, read-only memory (ROM) 356, network interface 358, storage device 360 and may include input device 362 and output device 364. RAM 354 and ROM 356 store program instructions that are executed by CPU 352 and data that is used during program execution. Network interface 358 couples the system/terminal to communication network 302, allowing data communications with other elements comprising the present invention. The implementation of network interface 358 depends upon the communication network used. For example, if the public switched telephone network is used, network interface 358 would be a modem or ISDN adapter. If a private or public local or wide area network is used, network interface 358 would be a dedicated adapter compatible with the particular network selected.

Storage device 360 stores data which is used by the present invention, such as customer records 366. Customer records 362 include security keys 368, which are associated with each customer's credit card account number. Input device 362 and output device 364 may be included in merchant terminal 350. The input device allows information relating to customers and transactions to be entered, for communication with credit card clearing house 300 or storage in storage device 360. The output device allows received and stored information to be displayed.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of processing transaction charges, comprising the steps of:

receiving a notification that a card, having a card account number associated with a continuing billing arrangement, has been invalidated and thereafter:

responsive to receiving a charge relating to the continuing billing arrangement, the charge including the card account number and a security key associated with the continuing billing arrangement, authorizing the charge; and responsive to receiving a charge relating to the continuing billing arrangement, the charge including the card account number and not including the security key, rejecting the charge.

2. The method of claim 1, wherein the card has been invalidated because it has been stolen.

3. The method of claim 1, wherein the card has been invalidated because it has been lost.

4. The method of claim 1, wherein the card has been invalidated because it has expired.

5. The method of claim 1, wherein the card is a credit card.

6. The method of claim 1, wherein the card is a debit card.

7. A method of processing transaction charges, comprising the steps of:

receiving a first charge relating to a continuing billing arrangement, the charge including an account number, from a merchant;

sending a charge authorization, including a security key associated with the continuing billing arrangement; to the merchant;

receiving a notification that the account number has been invalidated and thereafter:

responsive to receiving a second charge relating to the continuing billing arrangement, the charge including the account number and the security key, authorizing the charge; and responsive to receiving a second charge relating to the continuing billing arrangement, the charge including the account number and not including the security key, rejecting the charge.

8. The method of claim 7, further comprising the steps of:

keeping an account indicated by the account number open when the account number is invalidated; and charging authorized charges to the account.

9. The method of claim 8, wherein the account number has been invalidated because a card associated with the account number has been stolen, lost or has expired.

10. The method of claim 9, wherein the card is a credit card.

11. The method of claim 9, wherein the card is a debit card.

12. The method of claim 7, further comprising the steps of:

closing a first account indicated by the account number when the account number is invalidated; and charging authorized charges to a second account.

13. The method of claim 12, wherein the first account has been closed.

14. The method of claim 13, wherein the first account is a checking account or a savings account.

15. The method of claim 12, wherein the first account has been transferred to the second account.

16. The method of claim 15, wherein the first account is a checking account or a savings account and the second account is a checking account or a savings account.

17. A method of processing transaction charges, comprising the steps of:

receiving a plurality of charges to an account number, each charge relating to a different one of a plurality of continuing billing arrangements, each charge including the account number, from a merchant;

sending a charge authorization for each charge, each charge authorization including a security key, the security key included in each charge authorization corresponding to the continuing billing arrangement to which the charge authorization corresponds, to the merchant;

receiving a notification that the account number has been invalidated and thereafter:

responsive to receiving an additional charge including the account number and a security key corresponding to one of the continuing billing arrangements, authorizing the charge; and responsive to receiving an additional charge including the account number and not including a security key corresponding to one of the continuing billing arrangements, rejecting the charge.

18. The method of claim 17, wherein the received additional charge further includes additional information related to a transaction and the step of authorizing the charge includes the steps of:

accessing information relating to the continuing billing arrangement identified by the security key;

verifying the additional information related to the transaction; and authorizing the charge.

19. The method of claim 18, wherein the additional information related to the transaction includes an identity of a merchant, the information related to the continuing billing arrangement includes an identification of an authorized merchant, and the verifying step includes the step of verifying that the identified merchant is authorized to make the received charge.

20. The method of claim 18, wherein the additional information related to the transaction includes a date of the charge, the information related to the continuing billing arrangement includes an indication of an authorized date, and the verifying step includes the step of verifying the date of the charge.

21. The method of claim 18, wherein the additional information related to the transaction includes an amount of the charge, the information related to the continuing billing arrangement includes an indication of an authorized amount, and the verifying step includes the step of verifying that the identified merchant is authorized to make the received charge.

22. The method of claim 17, wherein the step of authorizing the charge includes the step of:

redirecting the charge to another account.

23. The method of claim 17, wherein the step of authorizing the charge includes the step of:

allowing a customer to specify whether the charge is to be authorized.

24. A method of processing transaction charges comprising the steps of:

receiving a continuing charge authorization relating to a continuing billing arrangement from a customer, the continuing charge authorization including an account number and a security key;

sending a charge relating to the continuing billing arrangement to a clearinghouse, the charge including the account number and the security key, wherein the account number has been invalidated; and receiving a charge authorization from the clearinghouse.

25. The method of claim 24, wherein the account number relates to a credit card or a debit card and the account number has been invalidated because the credit card or debit card has been stolen or lost, or has expired.

26. The method of claim 24, wherein the account number relates to a checking account or a savings account and the account number has been invalidated because the checking account or savings account has been closed or transferred.

27. A method of processing transaction charges comprising the steps of:

receiving a continuing charge authorization relating to a continuing billing arrangement from a customer, the continuing charge authorization including an account number;

sending a first charge relating to the continuing billing arrangement, the charge including the account number, to a clearinghouse;

receiving a charge authorization, including a security key associated with the continuing billing arrangement, from the clearinghouse;

storing the security key;

sending a second charge relating to the continuing billing arrangement, including the account number and the security key, wherein the account number has been invalidated, to the clearinghouse; and receiving a charge authorization from the clearinghouse.

28. The method of claim 27, wherein the account number relates to a credit card or a debit card and the account number has been invalidated because the credit card or debit card has been stolen or lost, or has expired.

29. The method of claim 27, wherein the account number relates to a checking account or a savings account and the account number has been invalidated because the checking account or savings account has been closed or transferred.

30. A system for processing transaction charges, comprising:
- a receiving device operable to receive a notification that an account number associated with a continuing billing arrangement has been invalidated; and
- an authorization device operable to:
  - receive a charge relating to the continuing billing arrangement, the charge including the account number and a security key associated with the continuing billing arrangement and, in response, authorize the charge even though the notification that the account number associated with the continuing billing arrangement has been invalidated has been received, and
  - receive a charge relating to the continuing billing arrangement, the charge including the account number and not including the security key and, in response, reject the charge.

31. The method of claim 30, wherein the account number relates to a credit card or a debit card and the account number has been invalidated because the credit card or debit card has been stolen or lost, or has expired.

32. The method of claim 30, wherein the account number relates to a checking account or a savings account and the account number has been invalidated because the checking account or savings account has been closed or transferred.

33. A system for processing transaction charges, comprising:
- a first receiving device operable to receive a first charge relating to a continuing billing arrangement, the first charge including an account number, from a merchant;
- a sending device operable to send a charge authorization, including a security key associated with the continuing billing arrangement; to the merchant;
- a second receiving device operable to receive a notification that the account number has been invalidated; and
- an authorization device operable to:
  - receive a charge relating to the continuing billing arrangement, the charge including the account number and a security key and, in response, authorize the charge even though the notification that the account number associated with the continuing billing arrangement has been invalidated has been received, and
  - receive a charge relating to the continuing billing arrangement, the charge including the account number and not including the security key and, in response, reject the charge.

34. The method of claim 33, wherein the account number relates to a credit card or a debit card and the account number has been invalidated because the credit card or debit card has been stolen or lost, or has expired.

35. The method of claim 33, wherein the account number relates to a checking account or a savings account and the account number has been invalidated because the checking account or savings account has been closed or transferred.

36. A system for processing transaction charges, comprising:
- a first receiving device operable to receive a plurality of charges to an account number, each charge relating to a different one of a plurality of continuing billing arrangements, each charge including the account number, from a merchant;
- a sending device operable to send a charge authorization for each charge, each charge authorization including a security key, the security key included in each charge authorization corresponding to the continuing billing arrangement to which the charge authorization corresponds, one of the plurality of continuing billing arrangements, to the merchant;
- a second receiving device operable to receive a notification that the account number has been invalidated; and
- an authorization device operable to:
  - receive an additional charge including the account number and a security key corresponding to one of the continuing billing arrangements and, in response, authorize the charge even though the notification that the account number associated with the continuing billing arrangement has been invalidated has been received, and
  - receive an additional charge including the account number and not including a security key corresponding to one of the continuing billing arrangements and, in response, reject the charge.

37. The system of claim 36, wherein the received additional charge further includes additional information related to a transaction and the authorization device is further operable to:
- access information relating to the continuing billing arrangement identified by the security key;
- verify the additional information related to the transaction; and
- authorize the charge.

38. The system of claim 37, wherein the additional information related to the transaction includes an identity of a merchant, the information related to the continuing billing arrangement includes an identification of an authorized merchant, and the authorization device is operable to verify the additional information related to the transaction by verifying that the identified merchant is authorized to make the received charge.

39. The system of claim 37, wherein the additional information related to the transaction includes a date of the charge, the information related to the continuing billing arrangement includes an indication of an authorized date, and the authorization device is operable to verify the additional information related to the transaction by verifying the date of the charge.

40. The system of claim 37, wherein the additional information related to the transaction includes an amount of the charge, the information related to the continuing billing arrangement includes an indication of an authorized amount, and the authorization device is operable to verify the additional information related to the transaction by verifying that the identified merchant is authorized to make the received charge.

41. The system of claim 36, wherein the authorization device is operable to:
- redirect the charge to another credit card account.

42. The system of claim 36, wherein the authorization device is operable to:
- allow a customer to specify whether the charge is to be authorized.

43. A system for processing transaction charges comprising:
- a first receiving device operable to receive a continuing charge authorization relating to a continuing billing arrangement from a customer, the continuing charge authorization including an account number and a security key associated with the continuing billing arrangement;

a sending device operable to send a charge relating to the continuing billing arrangement to a clearinghouse, the charge including the account number and the security key, wherein the account number has been invalidated; and a second receiving device operable to receive a charge authorization from the credit card clearinghouse.

44. The method of claim 43, wherein the account number relates to a credit card or a debit card and the account number has been invalidated because the credit card or debit card has been stolen or lost, or has expired.

45. The method of claim 43, wherein the account number relates to a checking account or a savings account and the account number has been invalidated because the checking account or savings account has been closed or transferred.

46. A system for processing transaction charges, comprising:

a first receiving device operable to receive a continuing charge authorization relating to a continuing billing arrangement from a customer, the continuing charge authorization including an account number;

a first sending device operable to send a first charge relating to the continuing billing arrangement, the charge including the account number, to a clearinghouse;

a second receiving device operable to receive a charge authorization, including a security key associated with the continuing billing arrangement; from the clearinghouse;

a storage device operable to store the security key;

a second sending device operable to send a second charge relating to the continuing billing arrangement, including the account number and the security key, wherein the account number has been invalidated; and a third receiving device operable to receive a charge authorization from the clearinghouse.

47. The method of claim 46, wherein the account number relates to a credit card or a debit card and the account number has been invalidated because the credit card or debit card has been stolen or lost, or has expired.

48. The method of claim 46, wherein the account number relates to a checking account or a savings account and the account number has been invalidated because the checking account or savings account has been closed or transferred.

49. A system of processing transaction charges, comprising:

means for receiving notification that a credit card or debit card associated with an account number has been lost, stolen, or has expired; and means, responsive to receipt of the notification, for rejecting all charges made to the account number, except responsive to receiving a charge to the account number, wherein the charge includes a security key associated with a continuing billing arrangement, authorizing the charge.

\* \* \* \* \*